Sept. 8, 1931.  H. Z. COBB  1,822,516
WHEEL FRAME
Filed Nov. 29, 1929
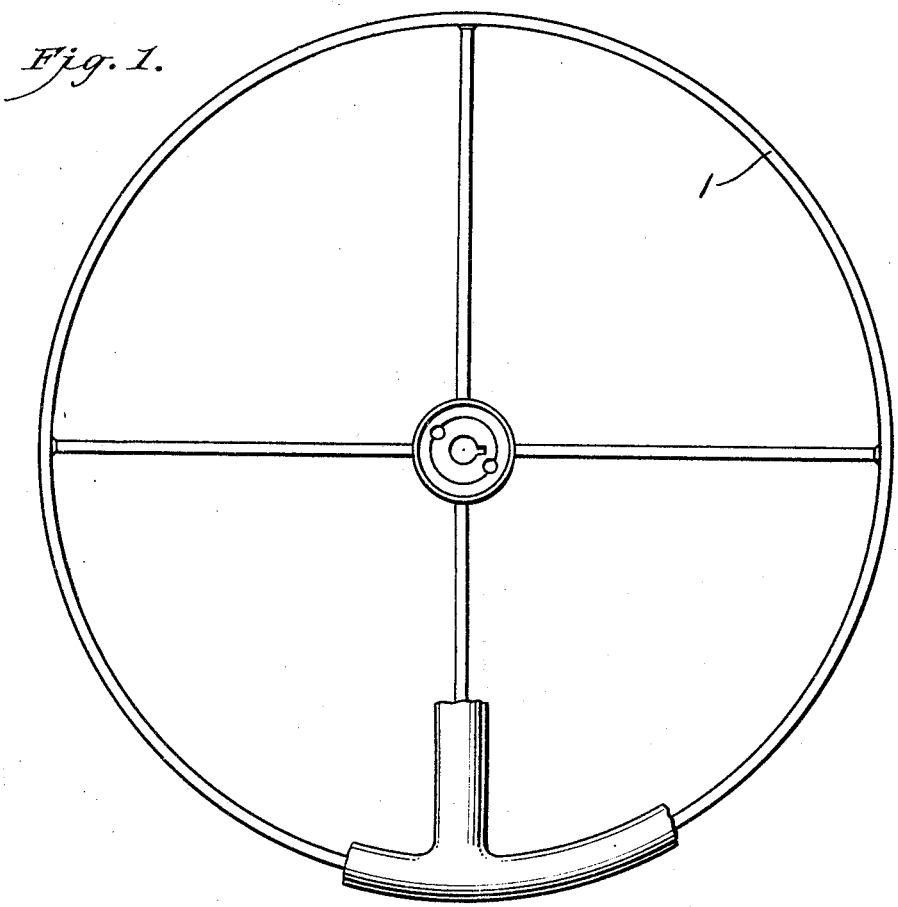
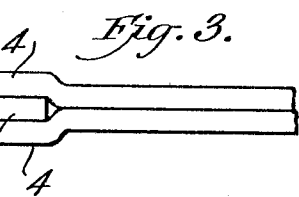
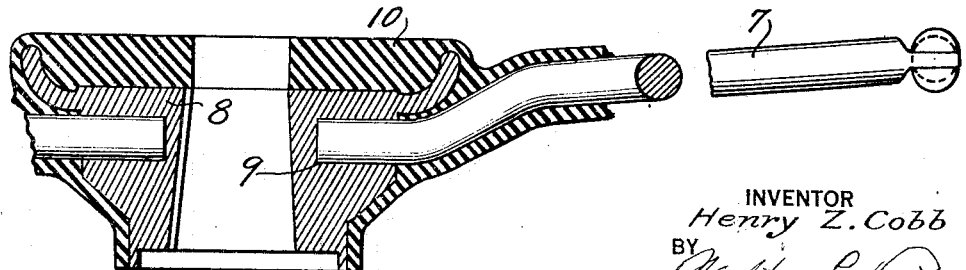
INVENTOR
Henry Z. Cobb
BY
ATTORNEY Patented Sept. 8, 1931

1,822,516

UNITED STATES PATENT OFFICE

HENRY Z. COBB, OF PROVIDENCE, RHODE ISLAND, ASSIGNOR TO REVERE RUBBER COMPANY, OF CHELSEA, MASSACHUSETTS, A CORPORATION OF RHODE ISLAND

WHEEL FRAME

Application filed November 29, 1929. Serial No. 410,388.

This invention relates to a frame for wheels, and more particularly to automobile steering wheels.

It is the object of this invention to provide a novel frame construction for a wheel. The other objects and advantages of the invention will appear in the following detailed description taken in connection with the accompanying drawings, in which:

Fig. 1 is a plan view of the wheel frame of this invention;

Fig. 2 is a detail view in section of the wheel frame of this invention;

Fig. 3 is a detail view showing the joint construction between the spokes and rim.

According to this invention, the rim 1 of the frame is made up of two rings 2—2 which preferably are circular in shape, although other shapes may be employed in accordance with the uses to which the wheel is to be put. The rings 2—2 preferably are half round in cross section so that when the rings 2—2 are juxtaposed they fit together along the flat interfaces 3 to form the rim. It is clear, however, that the cross sectional shape of the rings 2—2 may be other than that shown. For instance the rings may have a rectangular or any other polygonal cross-section.

The rings 2 may be formed in any suitable manner, and preferably are formed by bending a straight rod of the metal having the cross section desired into ring form and uniting the ends thereof by welding, or in any other suitable manner. The rings 2 are formed as shown at 4—4 so as to provide a slot or opening 5 therebetween into which the extremity 6 of the spoke 7 fits. The portions 4—4 of the rings 2—2 may be and preferably are formed by bending the ring. The slot formed between the portions 4—4 may be of any desired shape, either polygonal or circular, and either symmetrical or unsymmetrical. The form of slot shown in Fig. 3 is the one preferred. The extremity 6 of the spoke 7 which fits into the slots 5 is shaped to correspond to the slot and may be either rectangular or any other shape corresponding to the shape of the slot. Where the spoke 7 is circular in cross section, the extremity 6 may be formed by pressing the end of the spoke 7 to that shape. Obviously the spoke 7 may be of any suitable cross section. A hub 8 is secured in the inner extremities of the spokes 7, preferably by fitting the ends of the spokes 7 into recesses 9 in the hub. The ends of the spoke 7 may be secured to the hub 8 in any suitable manner as by brazing, soldering, welding, or by employing a plastic material forced into the recesses 9 around the ends of the spokes 7 in the manner described and claimed in my copending application Serial No. 410,387 filed of even date herewith.

The rim 1 is secured to the spoke 7 in any suitable manner as by welding or brazing or soldering the extremity 6 to those portions of the rim adjacent thereof, or in lieu thereof a clip may be arranged around the spoke and rim so as to secure the spoke and rings together in the form of a frame.

Preferably the frame is covered by a suitable plastic composition such as hard rubber composition 10 which is formed thereover by molding.

While a specific form of the invention has been described by way of illustration, it is not intended so to limit the invention for many changes in the details thereof may be made as will be clear to one skilled in the art which are within the scope of the following claims.

Having thus described my invention, what I claim and desire to protect by Letters Patent is:

1. A wheel frame having a pair of metal rings juxtaposed to form a solid rim, said rings being bent to provide openings therebetween at intervals spaced around the rim, spokes having extremities fitting into the openings, means for securing the spokes and rim together, and a hub carried by the other extremities of the rim.

2. A wheel frame having a pair of half round metal rings juxtaposed with flat faces in contact to form a rim, said rings being formed to provide rectangular openings therebetween at intervals spaced around the rim, spokes having flattened ends fitting into the openings, means for securing the spokes and rim together, and a hub carried by the other extremities of the rim.

3. A wheel frame having a pair of metal rings juxtaposed in face to face contact to form a solid rim, said rings being bent across the face thereof to provide openings therebetween at intervals spaced around the rim, spokes having extremities shaped to fit into the openings, means for securing the extremities of the spokes in the openings of the rim, and a hub carried by the other extremities of the spokes.

4. A wheel frame having a pair of metal rings juxtaposed in faced contact to form a solid rim, said rings being bent across the face thereof to provide openings therebetween at intervals spaced around the rim, spokes having extremities shaped to fit into the openings, said spoke extremities and the rim being united by welds, and a hub carried by the other extremities of the spokes.

Signed at Providence, county of Providence, State of Rhode Island, this 22nd day of November, 1929.

HENRY Z. COBB.